United States Patent
Clark et al.

(10) Patent No.: US 8,533,506 B2
(45) Date of Patent: Sep. 10, 2013

(54) SYSTEM WAKEUP ON WIRELESS NETWORK MESSAGES

(75) Inventors: Jeffrey Clark, Cary, NC (US); Mark Charles Davis, Durham, NC (US); Justin Tyler Dubs, Durham, NC (US); Steven Richard Perrin, Raleigh, NC (US); Jennifer Greenwood Zawacki, Hillsboro, NC (US); Dekui Zhang, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 444 days.

(21) Appl. No.: 12/793,814

(22) Filed: Jun. 4, 2010

(65) Prior Publication Data

US 2011/0302436 A1  Dec. 8, 2011

(51) Int. Cl.
G06F 1/32 (2006.01)
G06F 1/26 (2006.01)
G06F 3/00 (2006.01)

(52) U.S. Cl.
USPC ............... 713/320; 713/321; 713/323; 710/1; 710/5

(58) Field of Classification Search
None
See application file for complete search history.

(56) References Cited

U.S. PATENT DOCUMENTS

| 5,396,443 | A | * | 3/1995 | Mese et al. | 713/321 |
| 6,326,825 | B1 | * | 12/2001 | Walley | 327/160 |
| 2004/0185834 | A1 | * | 9/2004 | Sommers et al. | 455/414.1 |
| 2004/0249894 | A1 | * | 12/2004 | Nishimura | 709/206 |
| 2005/0216943 | A1 | * | 9/2005 | Rodolico | 725/105 |
| 2005/0255833 | A1 | * | 11/2005 | Bar-Or | 455/412.1 |
| 2005/0289363 | A1 | * | 12/2005 | Tsirkel et al. | 713/300 |
| 2010/0058082 | A1 | * | 3/2010 | Locker et al. | 713/320 |
| 2010/0115144 | A1 | * | 5/2010 | Dubs et al. | 710/8 |
| 2011/0302436 | A1 | * | 12/2011 | Clark et al. | 713/323 |

* cited by examiner

Primary Examiner — Tanh Nguyen
(74) Attorney, Agent, or Firm — John L. Rogitz; John M. Rogitz

(57) ABSTRACT

While an information handling device is in a reduced power state, the information handling device transitions from the reduced power state to a higher power state in response to receiving a message over an established wireless network connection that maintains a presence on a wireless network. In turn, the information handling device processes the message accordingly in the higher power state.

12 Claims, 6 Drawing Sheets

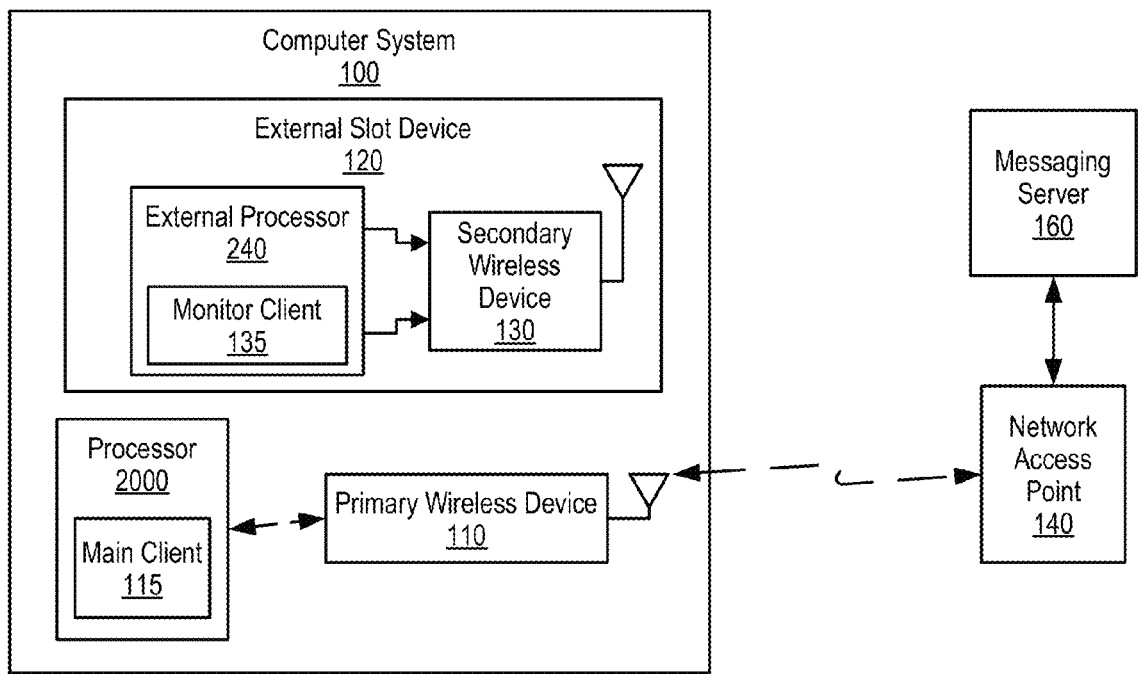
*FIG. 3A (High Power State)*
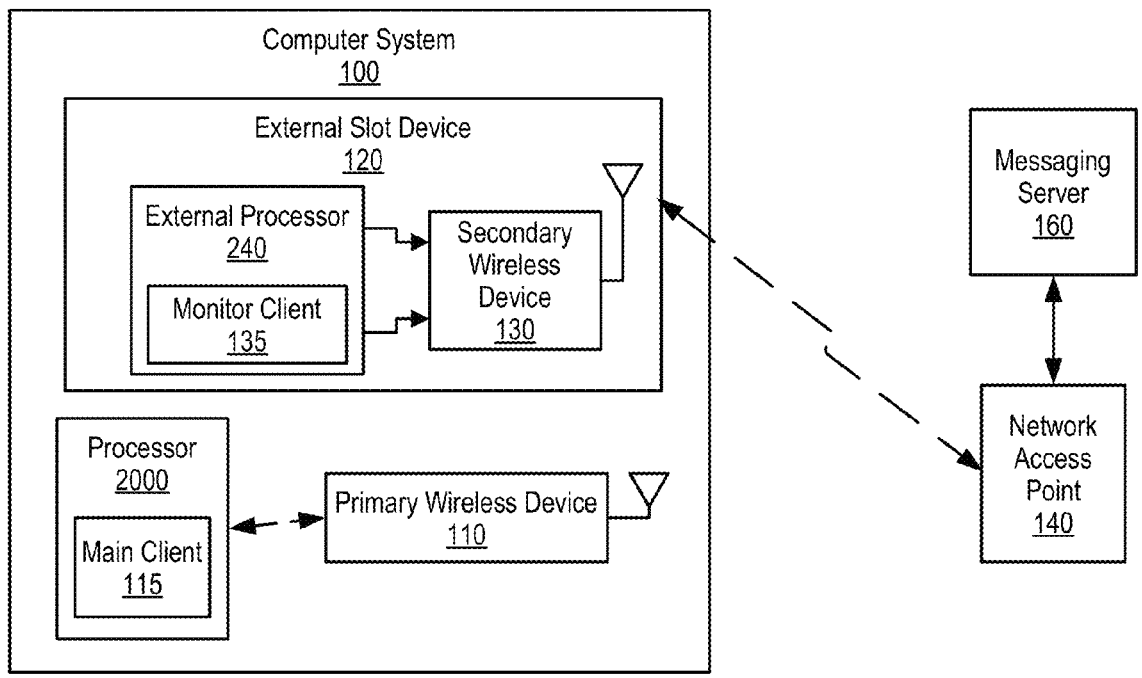
*FIG. 3B (Low Power State)*

SYSTEM WAKEUP ON WIRELESS NETWORK MESSAGES

TECHNICAL FIELD

The present disclosure relates to wireless information handling devices and more particularly to receiving messages in various power states of the wireless information handling devices.

BACKGROUND

In certain situations, information handling devices, such as computers, notebooks, mobile phones, etc., may not power down completely, but instead, may enter reduced power states such as sleep modes (e.g., S2, S3) or a hibernate mode (e.g., S4). Other devices may be externally connected to an information handling device through the information handling device's ports or slots that receive power from the information handling device. For example, a laptop computer may have an ExpressCard slot in which a user may insert an ExpressCard. In this example, the ExpressCard may include a wireless transceiver, such as a WiFi transceiver, that the information handling device utilizes in order to wirelessly communicate with other devices.

SUMMARY

While an information handling device is in a reduced power state, the information handling device transitions from the reduced power state to a higher power state in response to receiving a message over an established wireless network connection that maintains a presence on a wireless network. In turn, the information handling device processes the message accordingly in the higher power state.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein:

FIG. 3A is a diagram showing a computer system communicating with a network access point in a high power state through an internal, primary wireless device;

FIG. 3B is a diagram showing a computer system communicating with a network access point in a reduced power state through an external slot device's secondary wireless device;

DETAILED DESCRIPTION

Figure 1:
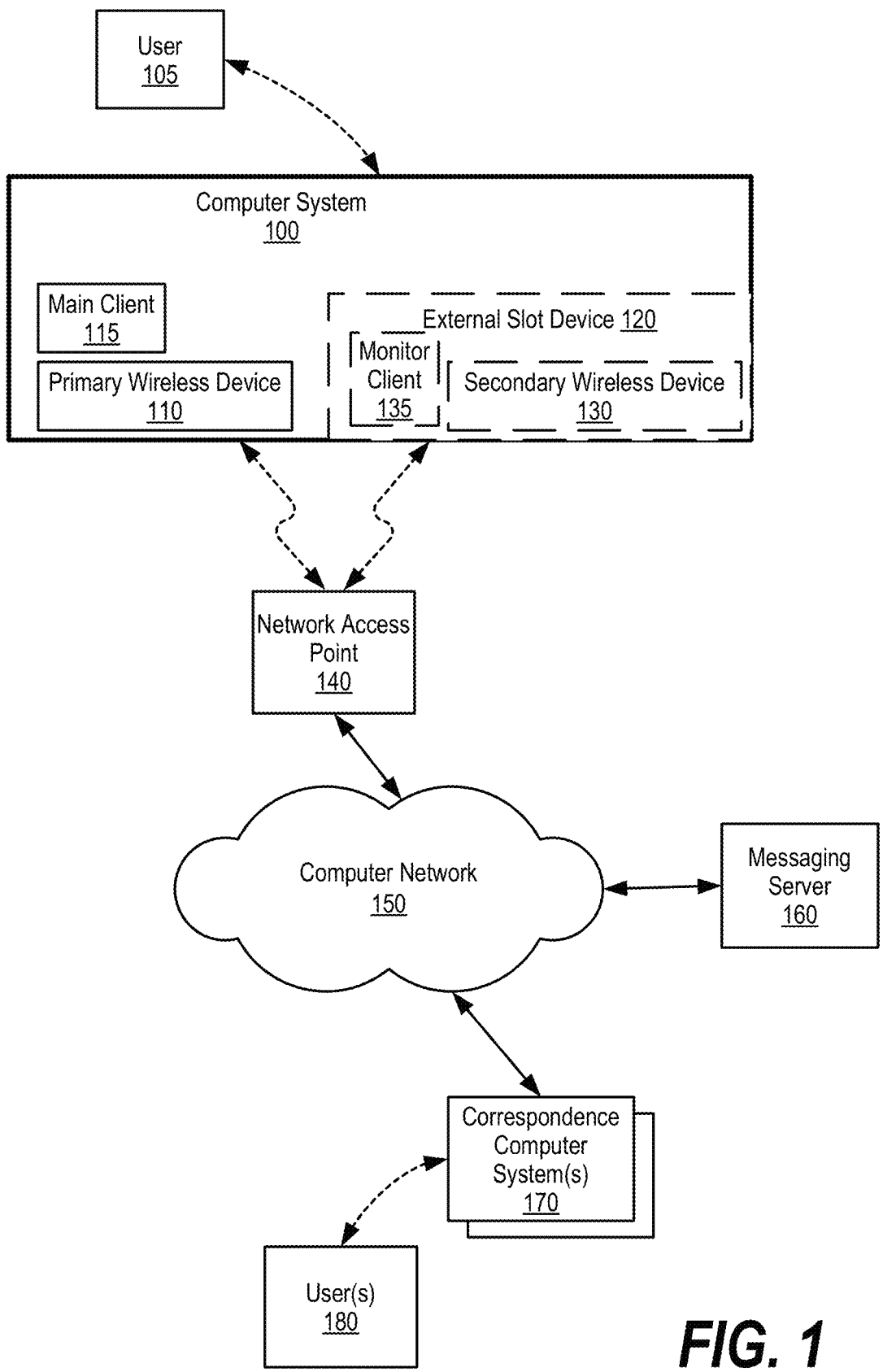
FIG. 1 is a diagram showing a computer system using an external slot device to monitor wireless network activity when the computer system is in a reduced power state.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
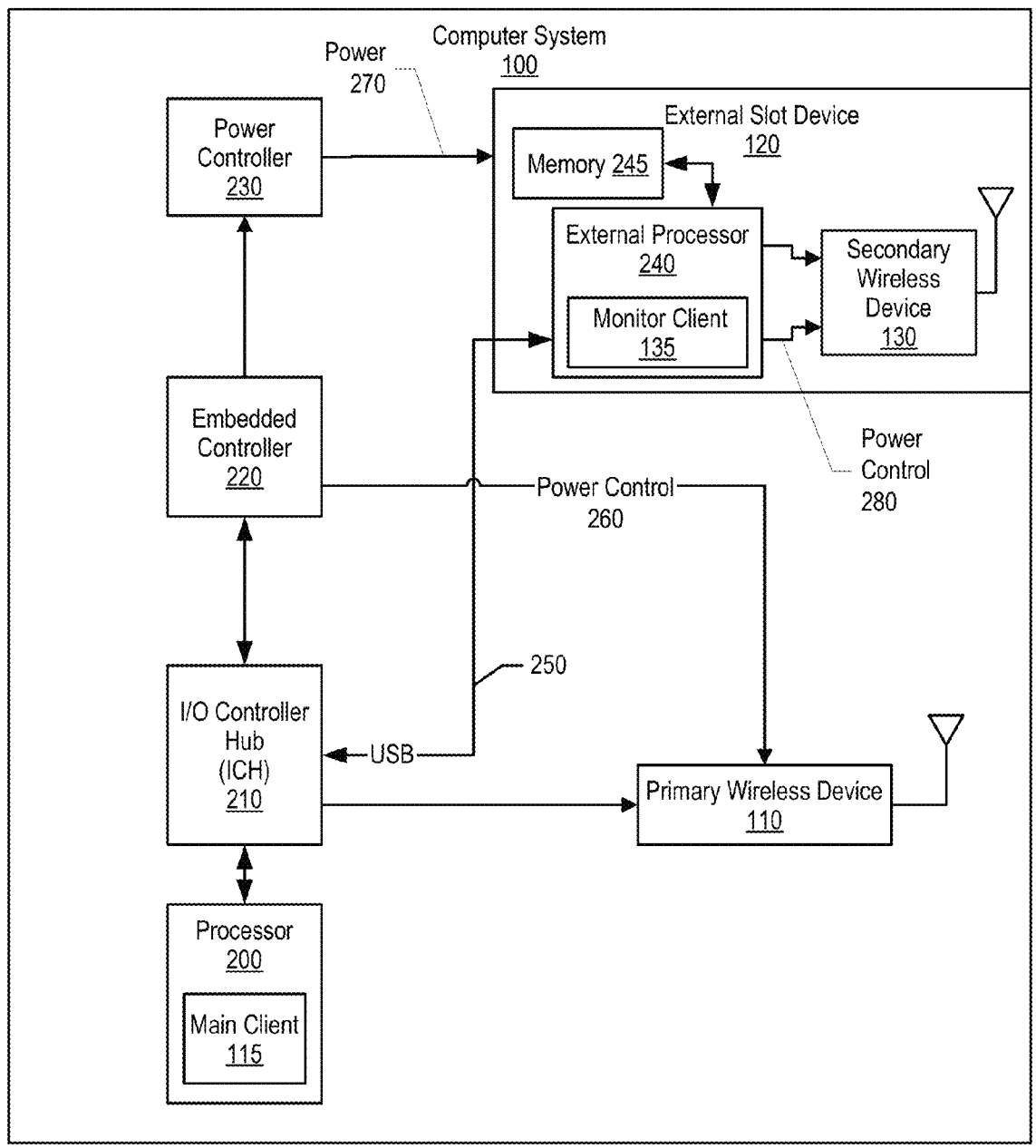
FIG. 2 is a diagram showing a computer system that includes an external slot device that monitors wireless network traffic when the computer system is in a low power state.

FIG. 1 is a diagram showing a computer system using an external slot device to monitor wireless network activity when the computer system is in a reduced power state. This disclosure allows a user to maintain a "presence" on a wireless network (e.g., for instant messaging) while a computer system is in a state that utilizes relatively low power (e.g., sleep mode or hibernate mode). Although specific examples provided herein refer to a computer system, the concepts described herein apply to any information handling device including mobile phones, small handheld palmtops or personal data organizers, small and large notebook computers, desktop computers, etcetera, as covered by the claims.

User 105 uses computer system 100 to connect to computer network 150 through network access point 140 in order to send/receive wireless messages to/from correspondence computer systems 170 (through messaging server 160). In particular situations, user 105 may wish to have computer system 100 monitor wireless network traffic when computer system 100 is in a reduced power state. For example, user 105 may be involved in an instant messaging session with one or more of users 180 and has to place computer system 100 (e.g., laptop computer) in hibernate mode for a short period. In another example, computer system 100 may be low on battery power and automatically enter hibernate mode until user 105 plugs in a power supply to computer system 100. In either case, user 105 may wish to have computer system 100 monitor wireless network traffic in order for user 105 to not miss messages.

Computer system 100 includes primary wireless device 110 for connecting with network access point 140. For example, computer system 100 may be a laptop computer and primary wireless device 110 may be an internal wireless network card. Computer system 100 also includes external slot device 120, such as an external card in an ExpressCard form factor. External slot device 120 includes secondary wireless device 130 and monitor client 135. In one embodiment, external slot device 120 may be an Always On/Constant Connect 2.0 card (CC card).

When computer system 100 is in a high power state, primary wireless device 110 establishes a wireless connection with network access point 120. In turn main client 115 establishes a socket connection with instant messaging server 160 through computer network 150 (e.g., the Internet). A socket connection establishes bidirectional communication between a server program and one or more client programs. The socket connection associates a server program to a hardware port in order for a client program to communicate with the server program through the hardware port.

By establishing the socket connection, main client 115 sends/receives messages to/from correspondence computer systems 170 through messaging server 160. In one embodiment, main client 115 includes a) a user interface through which user 105 may login/logout and view received message or compose messages, and b) a standard protocol implementation to communicate with messaging server 160 (e.g., XMPP, SIP, and SIMPLE). The protocols define messages that are exchanged between clients and servers, including messages to login, logout, report user status, send and receive messages, and report errors.

When computer system 100 enters a lower power state, computer system 100 disables primary wireless device 110 in order to conserve power. Concurrently, computer system 100 informs external slot device 120 of the reduced power state, which causes external slot device 120 to turn on. Secondary wireless device 130 establishes a wireless connection with network access point 120 and allows monitor client 135 to establish a socket connection with instant messaging server 160 using user 105's credentials. As a result, user 105 appears to continually be available to receive messages while computer system 100 is in the reduced power state.

Monitor client 135 monitors wireless network traffic for messages intended for user 105. When monitor client 135 detects an intended message, monitor client 135 notifies computer system 100 accordingly. In one embodiment, external slot device 120 and computer system 100 are linked via a universal serial bus (USB). In this embodiment, when monitor client 135 detects an intended message, external slot device 120 invokes computer system 100 to enter a high power state (S0 state) using a USB wakeup protocol. When computer system 100 wakes up, monitor client 135 breaks its socket connection with messaging server 160 and main client 115 re-establishes its socket connection with messaging server 160. In another embodiment, when monitor client 135 detects an incoming message, monitor client 135 examines the address of the message sender and, if the sender is on a pre-approved list, monitor client 135 sends a message for computer system 100 to enter the S0 state. Otherwise, monitor client 135 stores the message for later viewing, and computer system 100 remains in reduced power state.

In yet another embodiment, before monitor client 135 breaks its socket connection with message server 160, monitor client 135 responds to the sending correspondence computer system 170 in a manner that is protocol-specific. For example, in the case of an XMPP protocol (Extensible Messaging and Presence Protocol), monitor client 135 sends an "error" response, causing the sender (correspondence computer system 170) to resend the message. In this embodiment, the re-sent message is received by primary wireless device 110 and main client 115 because computer system 100 is, at that point, in a high power state.

In yet another embodiment, such as with a laptop PC, system behavior may be related to the state of the laptop lid. If the lid is open, computer system 100 behaves as described above. However, if the lid is closed, monitor client 135 may inform messaging server 160 that user 105 is "away", but it is still able to receive messages. In this embodiment, monitor client 135 does not awaken computer system 100 but, instead, may store messages for later viewing (see FIGS. 2, 4, and corresponding text for further details).

FIG. 2 is a diagram showing a computer system that includes an external slot device that monitors wireless network traffic when the computer system is in a reduced power state. Computer system 100 includes primary wireless device 110 (e.g., internal wireless card) for communicating with wireless networks. When computer system 100 is in a high power state, main client 115 (e.g., software application executing on processor 200) sends and receives messages (through I/O controller hub 210) over a wireless network using primary wireless device 110. In one embodiment, when computer system 100 enters a reduced power state, primary wireless device 110 may be disconnected from processor 200 and connected to external processor 240 (e.g., using an electrical switch).

Computer system 100 also includes a slot (e.g., ExpressCard slot, PCMCIA card slot, etc.) for which to insert external slot device 120. The example shown in FIG. 2 shows that external slot device 120 includes secondary wireless device 130, monitor client application 135 executing on external processor 240, and memory 245. Memory 245 may be volatile or non-volatile memory. When computer system 100 enters a reduced power state, embedded controller 220 disables power to primary wireless device 110 via power control 260 and informs power controller 230 to provide power to external slot device 120 via power line 270. In turn, external slot device 120 provides power to external processor 240, which invokes monitor client application 135 and provides power to secondary wireless device 130 via power control 280. As such, when computer system 100 enters a reduced power state, monitor client 135 and secondary wireless device 130 maintain a presence on the wireless network and monitor wireless network traffic. Monitor client 135 includes a standard messaging protocol implementation and an agent, which acts in place of a user. The agent includes logic that determines times at which to connect and disconnect to the server, and how to respond to messages received from the server.

When monitor client 135 detects a message (e.g., instant message) intended for computer system 100's user, monitor client 135 sends a message to processor 200 via USB 250 to wake up (enter a high power state). In the process of entering a high power state, embedded controller 220 turns on power to primary wireless device 110 and informs power control 230 to remove power from external slot device. As such, computer system 100 re-establishes wireless connectivity via primary wireless device 110 (see FIG. 4 and corresponding text for further details). In one embodiment, such as when a laptop computer's lid is closed, monitor client 135 stores received messages in memory 245 to provide to computer system 100 at a later time.

FIG. 3A is a diagram showing a computer system communicating with a network access point in a high power state through an internal, primary wireless device. Computer system 100 includes primary wireless device 110 and a slot that is adapted to receive external slot device 120, which includes external processor 240 and secondary wireless device 130.

FIG. 3A shows that when computer system 100 is in a high power state, computer system 100 communicates with network access point 140 through primary wireless device 110. In one embodiment, in order to ensure that secondary wireless device 130 does not interfere with these communications, external processor 240 disables secondary wireless device 130 when computer system 100 is in the high power state.

FIG. 3B is a diagram showing a computer system communicating with a network access point in a reduced power state through an external slot device's secondary wireless device. When computer system 100 enters a reduced power state, FIG. 3B shows that external slot device 120 communicates with network access point 140 using secondary wireless device 130. In one embodiment, in order to ensure that primary wireless device 110 does not interfere with these communications, computer system 100 disables primary wireless device 110 when computer system 100 is in the reduced power state (see FIG. 4 and corresponding text for further details).

Figure 4:
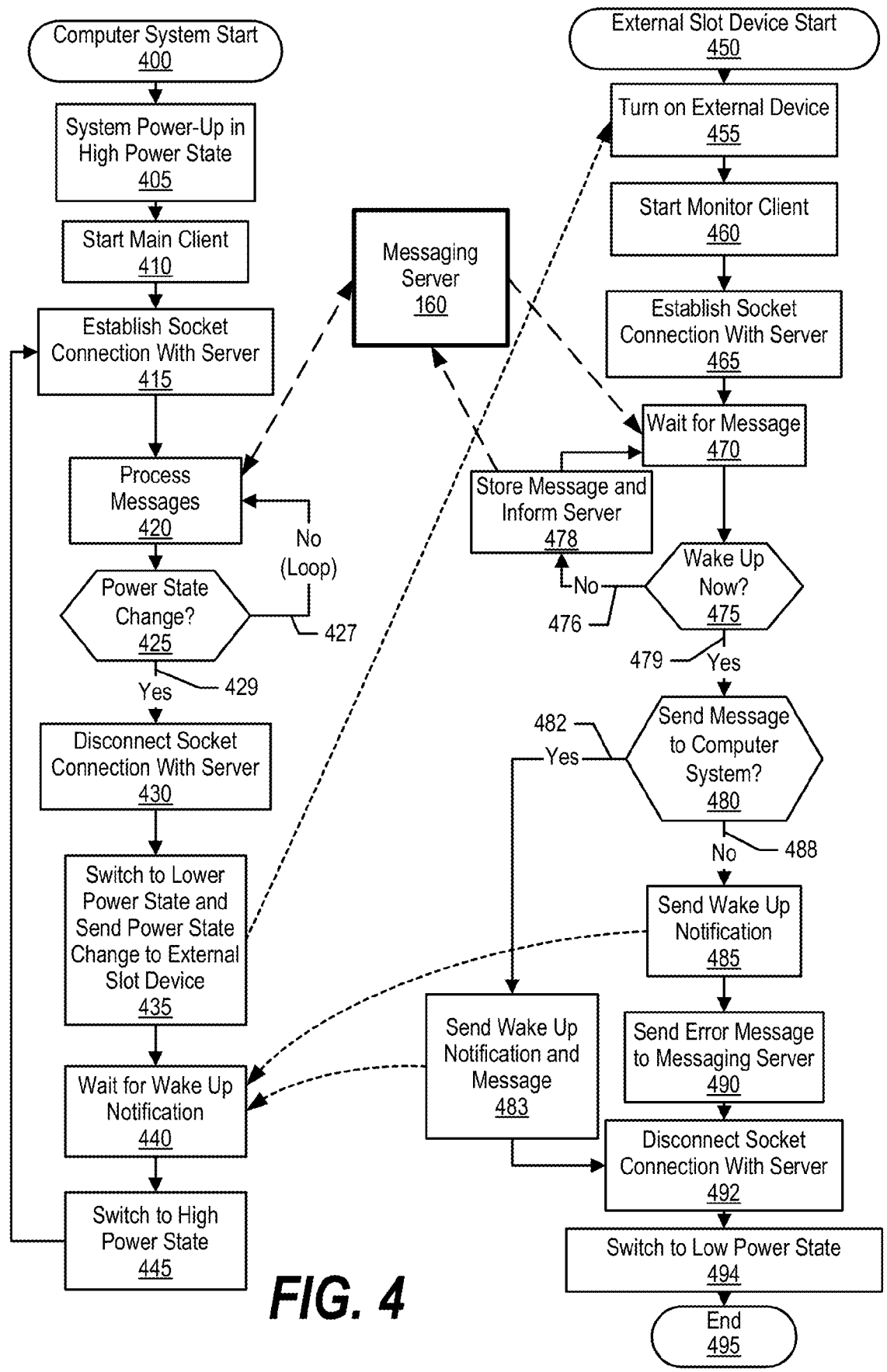
FIG. 4 is a flowchart showing steps taken in a computer system and an external slot device maintaining a presence in a wireless network when the computer system transitions between power state modes.

FIG. 4 is a flowchart showing steps taken in a computer system and an external slot device maintaining a presence in a wireless network when the computer system transitions between power state modes. As discussed previously, this disclosure allows a user to maintain a presence on a wireless network, such as for instant messaging, while a computer system is in a state that requires relatively low power. In turn, the computer system does not miss messages intended for the computer system's user.

Computer system processing commences at 400, whereupon the computer system initiates a high power state (normal start-up) at step 405. At step 410, the computer system invokes a main client application, such as main client 115 shown in FIG. 2. Next, at step 415, the computer system utilizes a primary wireless device, such as primary wireless device 110 shown in FIG. 2, to establish a socket connection with messaging server 160. For simplicity, network access point 140 and computer network 150 are not shown in FIG. 4 as a conduit to send/receive communication between the computer system and messaging server 160.

Once the computer system establishes the socket connection, the computer system processes messages (e.g., instant messages) at step 420, which are messages sent to and received from correspondence computer systems through messaging server 160. The computer system continues to process messages and monitors whether there is a power state change (decision 425). For example, the computer system's user may place the computer system in sleep mode, in hibernate mode, or close the lid. If there is not a power state change, decision 425 branches to "No" branch 427, which loops back to continue to process messages using the main client and primary wireless device.

This looping continues until a power state change occurs, at which point decision 425 branches to "Yes" branch 429 whereupon the computer system disconnects its socket connection with messaging server 160 at step 430 (e.g., stops responding). Next, the computer system switches to a lower power state and sends a message to the external slot device step 435.

At this point, external slot device processing commences at 450, whereupon the external slot device receives the power state change indication and turns on at step 455. Next, the external slot device initiates its monitor client at step 460, such as monitor client 135 shown in FIG. 2. The monitor client uses the same user credentials utilized by the computer system to establish a socket connection with messaging server 160 using a secondary wireless device located on the external slot device, such as secondary wireless device 130 shown in FIG. 2.

The monitor client waits for a message from messaging server 160 (step 470). Once the monitor client receives a message, a determination is made as to whether to wake up the computer system or wait for a later time based upon the computer's wake up parameters (decision 475). For example, the computer system may be a laptop computer with a closed lid, and the wake up parameters do not allow the computer to be woken up when its lid is closed. In this example, the monitor client stores messages and waits for a user to open up the computer system's lid before waking up the computer system. If the monitor client should wait to wake up the computer system, decision 475 branches to "No" branch 476 whereupon the monitor client stores the message (e.g., in memory 245 shown in FIG. 2) at step 478 and informs messaging server 160 that the user is away but can still receive messages.

On the other hand, if the monitor client should wake up the computer system, decision 475 branches to "Yes" branch 479. A determination is made as to whether to send the received message to the computer system or to send an error message to messaging server 160 in order for the originating correspondence computer system to resend the message (decision 480). If the monitor client should send the message to the computer system, decision 480 branches to "Yes" branch 482 whereupon the monitor client wakes up the computer system and sends the message to the computer system, such as using a USB wakeup protocol over USB bus 250 shown in FIG. 2 (step 483).

The computer system wakes up at step 440, switches to high power state at step 445, and re-establishes a socket connection with messaging server 160 to process messages. In conjunction, the external slot device disconnects its socket connection with messaging server 160 (step 492) and switches to a reduced power state (step 494).

On the other hand, if the external slot device is configured to not send the message to the computer system but, instead, send an error message to messaging server 160, decision 480 branches to "No" branch 488, whereupon the external slot device sends a wake up notification (e.g., using a USB wakeup protocol) to the computer system at step 485. Next, the monitor client sends an error message to messaging server 160 (step 490), indicating that the received message included errors which, in turn, causes the correspondence computer system that sent the original message to resend the message (which is received by the computer system's primary wireless device and processed by the computer system's IM client). At step 492, the external wireless device disconnects its socket connection with messaging server 160 and switches to a lower power state at step 494. External socket device processing ends at 495.

Figure 5:
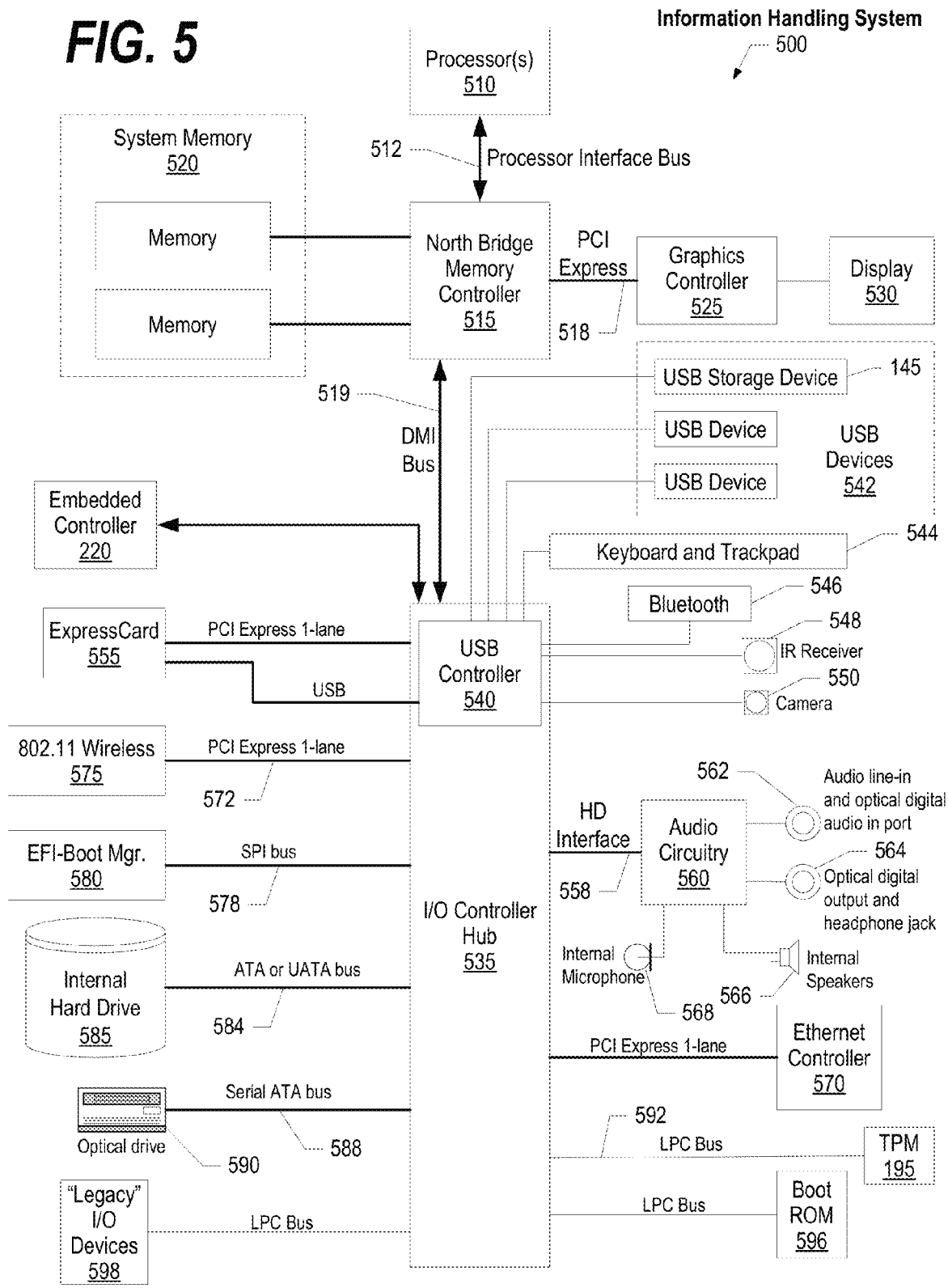
FIG. 5 is a block diagram example of a data processing system in which the methods described herein can be implemented.

FIG. 5 illustrates information handling system 500, which is a simplified example of a computer system capable of performing the computing operations described herein. Information handling system 500 includes one or more processors 510 (e.g., processor 200 shown in FIG. 2) coupled to processor interface bus 512. Processor interface bus 512 connects processors 510 to Northbridge 515, which is also known as the Memory Controller Hub (MCH). Northbridge 515 connects to system memory 520 and provides a means for processor(s) 510 to access the system memory. Graphics controller 525 also connects to Northbridge 515. In one embodiment, PCI Express bus 518 connects Northbridge 515 to graphics controller 525. Graphics controller 125 connects to display device 530, such as a computer monitor.

Northbridge 515 and Southbridge 535 connect to each other using bus 519. In one embodiment, the bus is a Direct Media Interface (DMI) bus that transfers data at high speeds in each direction between Northbridge 515 and Southbridge 535. In another embodiment, a Peripheral Component Interconnect (PCI) bus connects the Northbridge and the Southbridge. Southbridge 535, also known as the I/O Controller Hub (ICH) is a chip that generally implements capabilities that operate at slower speeds than the capabilities provided by the Northbridge. Southbridge 535 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 596 and "legacy" I/O devices (using a "super I/O" chip). The "legacy" I/O devices (598) can include, for example, serial and parallel ports, keyboard, mouse, and/or a floppy disk controller. The LPC bus also connects Southbridge 535 to Trusted Platform Module (TPM) 595. Other components often included in Southbridge 535 include a Direct Memory Access (DMA) controller, a Programmable Interrupt Controller (PIC), and a storage device controller, which connects Southbridge 535 to nonvolatile storage device 585, such as a hard disk drive, using bus 584.

ExpressCard 555 is a slot that connects hot-pluggable devices (e.g., external slot device 120 shown in FIG. 1) to the information handling system. ExpressCard 555 supports both PCI Express and USB connectivity as it connects to Southbridge 535 using both the Universal Serial Bus (USB) the PCI Express bus. Southbridge 535 includes USB Controller 540 that provides USB connectivity to devices that connect to the USB. These devices include webcam (camera) 550, infrared (IR) receiver 548, keyboard and trackpad 544, and Bluetooth device 546, which provides for wireless personal area networks (PANs). USB Controller 540 also provides USB connectivity to other miscellaneous USB connected devices 542, such as a mouse, removable nonvolatile storage device 545, modems, network cards, ISDN connectors, fax, printers, USB hubs, and many other types of USB connected devices. While removable nonvolatile storage device 545 is shown as a USB-connected device, removable nonvolatile storage device 545 could be connected using a different interface, such as a Firewire interface, etcetera.

Wireless Local Area Network (LAN) device 575 connects to Southbridge 535 via the PCI or PCI Express bus 572. LAN device 575 (e.g., primary wireless device 110 shown in FIG. 1) typically implements one of the IEEE 802.11 standards of over-the-air modulation techniques that all use the same protocol to wireless communicate between information handling system 500 and another computer system or device. Optical storage device 590 connects to Southbridge 535 using Serial ATA (SATA) bus 588. Serial ATA adapters and devices communicate over a high-speed serial link. The Serial ATA bus also connects Southbridge 535 to other forms of storage devices, such as hard disk drives. Audio circuitry 560, such as a sound card, connects to Southbridge 535 via bus 558. Audio circuitry 560 also provides functionality such as audio line-in and optical digital audio in port 562, optical digital output and headphone jack 564, internal speakers 566, and internal microphone 568. Ethernet controller 570 connects to Southbridge 535 using a bus, such as the PCI or PCI Express bus. Ethernet controller 570 connects information handling system 500 to a computer network, such as a Local Area Network (LAN), the Internet, and other public and private computer networks. Trusted Platform Module (TPM 595) provides security functions for information handling system 500.

While FIG. 5 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 6:
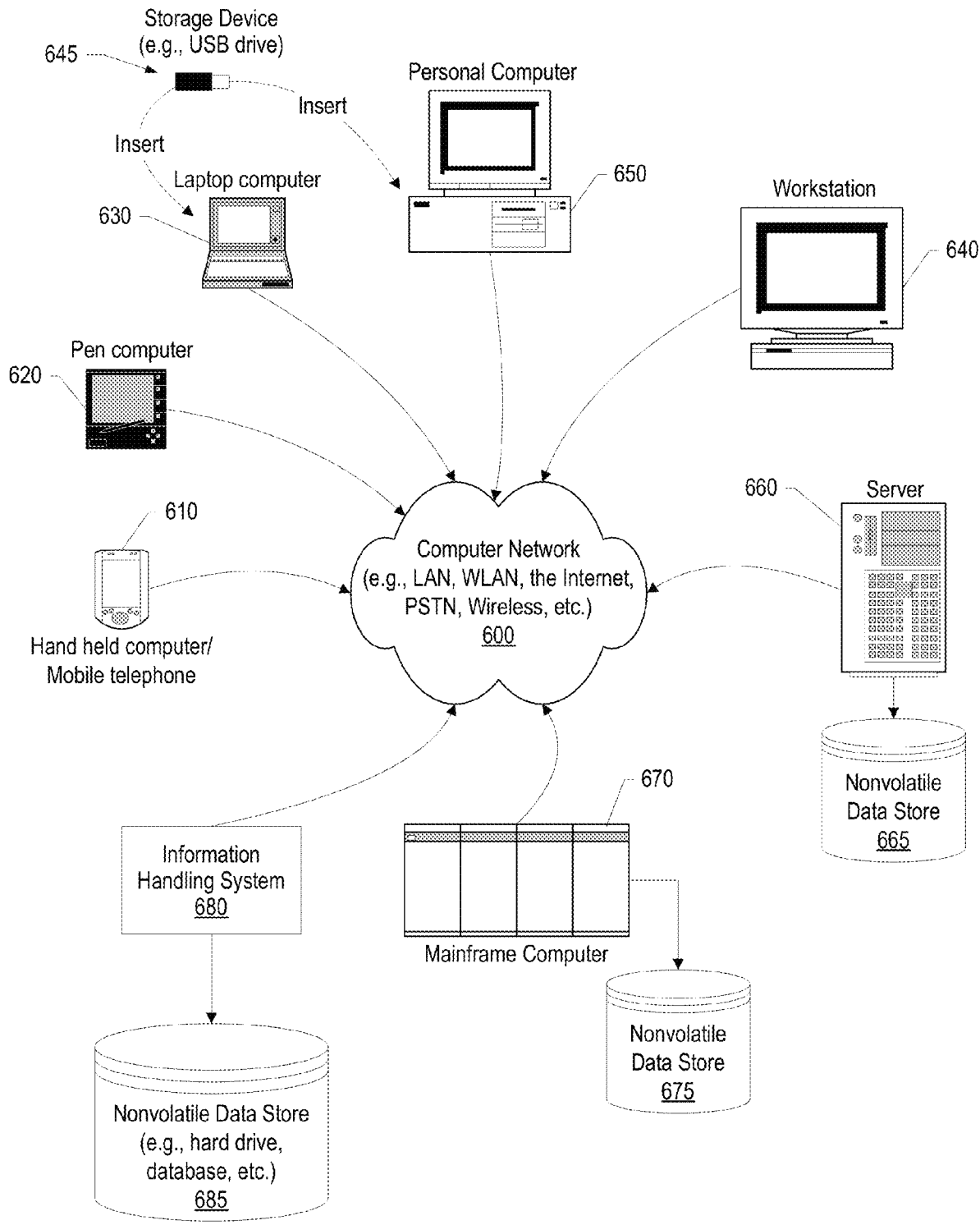
FIG. 6 provides an extension example of the information handling system environment shown in FIG. 5 to illustrate that the methods described herein can be performed on a wide variety of information handling systems which operate in a networked environment.

FIG. 6 provides an extension example of the information handling system environment shown in FIG. 5 to illustrate that the methods described herein can be performed on a wide variety of information handling systems that operate in a networked environment. Types of information handling systems range from small handheld devices, such as handheld computer/mobile telephone 610 to large mainframe systems, such as mainframe computer 670. Examples of handheld computer 610 include personal digital assistants (PDAs), personal entertainment devices, such as MP3 players, portable televisions, and compact disc players. Other examples of information handling systems include pen, or tablet, computer 620, laptop, or notebook, computer 630, workstation 640, personal computer system 650, and server 660. Other types of information handling systems that are not individually shown in FIG. 6 are represented by information handling system 680. As shown, the various information handling systems can be networked together using computer network 600. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 6 depicts separate nonvolatile data stores (server 660 utilizes nonvolatile data store 665, mainframe computer 670 utilizes nonvolatile data store 675, and information handling system 680 utilizes nonvolatile data store 685). The nonvolatile data store can be a component that is external to the various information handling systems or can be internal to one of the information handling systems. In addition, removable nonvolatile storage device 645 can be shared among two or more information handling systems using various techniques, such as connecting the removable nonvolatile storage device 645 to a USB port or other connector of the information handling systems.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   at an information handling device,
      enabling at least a first wireless device in response to the information handling device entering a reduced power state, wherein the first wireless device is enabled such that it at least wirelessly connects to a wireless network;
      transitioning from the reduced power state to a higher power state in response to receiving a message, wherein the message was received over the wireless network through an established network connection that maintains a presence on the wireless network;
enabling a second wireless device in response to receiving the message;
establishing a subsequent network connection using the second wireless device;
receiving the message over the subsequent network connection at least by sending an error message over the network connection; and
processing the message using the information handling device.

2. The method of claim 1 wherein the established network connection is a socket connection.

3. The method of claim 1 further comprising:
providing power to an external device in response to the information handling device entering the reduced power state, the external device including the first wireless device; and
receiving a wake up notification from the external device to transition to the higher power state.

4. The method of claim 3 wherein the message was received by the external device.

5. An information handling system comprising:
one or more processors;
a memory accessible by at least one of the processors;
one or more wireless devices accessible by at least one of the processors;
a set of instructions stored in the memory and executed by at least one of the processors in order to perform actions of:
entering a reduced power state;
enabling at least a first wireless device in response to the information handling system entering the reduced power state, wherein the first wireless device is enabled such that it at least wirelessly connects to a wireless network;
transitioning from the reduced power state to a higher power state in response to receiving a message, wherein the message was received over the wireless network through an established network connection that maintains a presence on the wireless network;
enabling a second wireless device in response to receiving the message;
establishing a subsequent network connection using the second wireless device;
receiving the message over the subsequent network connection at least by sending an error message over the network connection; and
processing the message.

6. The information handling system of claim 5 wherein the established network connection is a socket connection.

7. The information handling system of claim 5 wherein the set of instructions further performs actions of:
providing power to an external device in response to the information handling system entering the reduced power state, the external device including the first wireless device; and
receiving a wake up notification from the external device to transition to the higher power state.

8. The information handling system of claim 7 wherein the set of instructions further performs actions of:
receiving the message from the external device.

9. A machine-implemented method comprising:
enabling a first wireless device, the enabling performed in response to detecting that an information handling device entered a reduced power state;
establishing a network connection using the enabled first wireless device, the first wireless device maintaining a presence on a wireless network;
receiving, at the first wireless device, a message over the established network connection using the first wireless device while the information handling device is in the reduced power state;
notifying the information handling device to enter a higher power state in response to receiving the message; and
in response to determining not to send the message to the information handling device, using the enabled first wireless device to send an error message over the wireless network, wherein the error message is adapted to invoke resending the message to the information handling device.

10. The method of claim 9 wherein the established network connection is a socket connection.

11. The method of claim 9 further comprising:
determining to delay the notification of the information handling device based upon one or more wake up parameters; and
in response to delaying the notification of the information handling device:
storing the message; and
sending an away indicator message over the wireless network.

12. The method of claim 11 further comprising:
detecting that the information handling device meets the one or more wake up parameters; and
sending the stored message to the information handling device in response to the detecting.

* * * * *